United States Patent
Benosman et al.

(10) Patent No.: US 9,897,984 B2
(45) Date of Patent: Feb. 20, 2018

(54) MODEL PREDICTIVE CONTROL WITH UNCERTAINTIES

(71) Applicant: Mitsubishi Electric Research Laboratories, Inc., Cambridge, MA (US)

(72) Inventors: Mouhacine Benosman, Boston, MA (US); Stefano Di Cairano, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 637 days.

(21) Appl. No.: 14/451,913

(22) Filed: Aug. 5, 2014

(65) Prior Publication Data

US 2016/0041536 A1 Feb. 11, 2016

(51) Int. Cl.
*G05B 13/04* (2006.01)
(52) U.S. Cl.
CPC .................. *G05B 13/048* (2013.01)
(58) Field of Classification Search
CPC ................................................ G05B 13/048
See application file for complete search history.

(56) References Cited

U.S. PATENT DOCUMENTS

| | | | | |
|---|---|---|---|---|
| 6,738,682 B1* | 5/2004 | Pasadyn | ................. | G05B 13/04 700/100 |
| 6,757,579 B1* | 6/2004 | Pasadyn | ................. | G05B 13/04 700/108 |
| 9,235,657 B1* | 1/2016 | Wenzel | ............. | G05B 13/0265 |
| 2007/0088448 A1* | 4/2007 | Mylaraswamy | .... | G05B 23/0254 700/44 |
| 2007/0136035 A1* | 6/2007 | Minor | .................... | G06F 19/24 703/2 |
| 2007/0226157 A1* | 9/2007 | Kam | ....................... | G06F 19/12 706/15 |
| 2008/0208371 A1* | 8/2008 | Vermillion | ............. | G05B 11/32 700/30 |
| 2009/0177602 A1* | 7/2009 | Ning | ...................... | B60K 28/02 706/21 |
| 2010/0268353 A1* | 10/2010 | Crisalle | ................ | G05B 13/048 700/29 |
| 2012/0239165 A1* | 9/2012 | Li | .......................... | F24F 11/006 700/28 |
| 2013/0054003 A1* | 2/2013 | Weinzierl | ............... | B21B 37/74 700/153 |

(Continued)

*Primary Examiner* — Charles E Anya
(74) *Attorney, Agent, or Firm* — Gene Vinokur; James McAleenan; Hironori Tsukamoto

(57) ABSTRACT

A method controls a system for a multiple control steps according to the reference trajectory of a task of the operation to produce an actual trajectory of the system completing the task of the operation. For each control step, a control input to the system is determined using a model predictive control (MPC) having at least one parameter of uncertainty. The method determines a value of a learning cost function of a distance between the reference trajectory and the actual trajectory and determines, using a model free optimization, a value of the parameter of uncertainty reducing the value of the learning cost function. Next, the method determines a set of control inputs for completing the task according to the reference trajectory using the MPC with the updated parameter of uncertainty.

16 Claims, 9 Drawing Sheets

(56) References Cited

U.S. PATENT DOCUMENTS

| | | | |
|---|---|---|---|
| 2013/0080129 A1* | 3/2013 | Smith | G06N 99/005 703/6 |
| 2013/0190898 A1* | 7/2013 | Shilpiekandula | G05B 19/19 700/19 |
| 2013/0304235 A1* | 11/2013 | Ji | G05B 23/0297 700/29 |
| 2013/0304236 A1* | 11/2013 | Benosman | B66B 1/32 700/31 |
| 2014/0214373 A1* | 7/2014 | Jardin | G06F 3/048 703/2 |
| 2015/0005941 A1* | 1/2015 | Milenkovic | B25J 9/163 700/262 |
| 2015/0127150 A1* | 5/2015 | Ponulak | B25J 9/163 700/250 |
| 2015/0178633 A1* | 6/2015 | Elbsat | G06F 17/16 706/14 |
| 2015/0258683 A1* | 9/2015 | Izhikevich | B25J 9/163 700/250 |
| 2015/0275785 A1* | 10/2015 | Cygan, Jr. | F01L 1/34409 701/102 |

* cited by examiner

- Initialize $z(0) = 0$, and the uncertainties' vector estimate $\hat{\Delta}(0) = 0$.
- Choose a threshold for the cost function minimization $c_Q > 0$.
- Choose the parameters: MPC sampling time $\delta T_{mpc} > 0$, and MES sampling time $\delta T_{mes} = N_E \delta T_{mpc}$, $N_E > 0$.
- Choose the MES dither signals' amplitudes and frequencies: $a_i, \omega_i, i = 1, 2, \ldots, N_p$.

WHILE(true)

FOR($\ell = 1, \ell \leq N_E, \ell = \ell + 1$)
- Solve the MPC problem $$\min_{U(k)} \sum_{j=0}^{N-1} \|x(j|k)\|^2_{Q_M} + \|u(j|k)\|^2_{R_M}$$
$$+ \|x(N|k)\|^2_{P_M},$$

s.t. $x(i + 1|k) = (A + \Delta A)x(i|k)$
$$+ (B + \Delta B)u(i|k),$$
$$y(i|k) = (C + \Delta C)x(i|k)$$
$$+ (D + \Delta D)u(i|k),$$

$x_{\min} \leq x(i|k) \leq x_{\max}, \; i \in \mathbb{Z}_{[1, N_c]},$
$u_{\min} \leq u(i|k) \leq u_{\max}, \; i \in \mathbb{Z}_{[0, N_{cu}-1]},$
$y_{\min} \leq y(i|k) \leq y_{\max}, \; i \in \mathbb{Z}_{[1, N_c]},$
$u(i|k) = K_f x(i|k), \; i \in \mathbb{Z}_{[N_u, N-1]},$
$x(0|k) = x(k).$

- Update $k = k + 1$.

End

IF $Q > c_Q$
- Evaluate the MES cost function $Q(\hat{\Delta})$.
- Evaluate the new value of the uncertainties $\hat{\Delta}$:

$z_i(h+1) = z_i(h) + a_i \delta T_{mes} \sin(\omega_i h \delta T_{mes} + \frac{\pi}{2}) Q(\hat{\Delta})$
$\hat{\Delta}_i(h+1) = z_i(h+1) + a_i \sin(\omega_i h \delta T_{mes} - \frac{\pi}{2}),$
$i \in \{1, \ldots, N_p\}$

- Update $h = h + 1$.

End
Reset $\ell = 0$

End

*Fig. 6B*

MODEL PREDICTIVE CONTROL WITH UNCERTAINTIES

FIELD OF THE INVENTION

This invention relates generally to controlling an operation of a system, and more particularly to controlling the operation using a model predictive control (MPC) over a receding horizon.

BACKGROUND OF THE INVENTION

Many advanced control techniques are formulated as optimization problems, which can be solved by mathematical programming. One class of such techniques is optimization-based receding horizon control, such as model predictive control (MPC). There are MPC formulations for both linear and nonlinear systems. Nonlinear MPC solves nonlinear mathematical programs in real-time, which can be a challenging task due to a limitation on computing resources, the complexity of the problem to solve, or the time available to solve the problem. Therefore, most of the practical applications are based on a linearity assumption or approximation. The linear MPC typically solves a quadratic programming problem.

The MPC is based on an iterative, finite horizon optimization of a model of a system and has the ability to anticipate future events to take appropriate control actions. This is achieved by optimizing the operation of the system over a future finite time-horizon subject to constraints, and only implementing the control over the current timeslot. For example, the constraints can represent physical limitation of the system, legitimate and safety limitations on the operation of the system, and performance limitations on a trajectory. A control strategy for the system is admissible when the motion generated by the system for such a control strategy satisfies all the constraints. For example, at time t the current state of the system is sampled and an admissible cost minimizing control strategy is determined for a relatively short time horizon in the future. Specifically, an online or on-the-fly calculation determines a cost-minimizing control strategy until time t+T. Only the first step of the control strategy is implemented, then the state is sampled again and the calculations are repeated starting from the now current state, yielding a new control and new predicted state path. The prediction horizon keeps being shifted forward and for this reason MPC is also called receding horizon control.

The MPC can be used to generate the actual trajectory of the motion of the system based on a model of the system and the desired reference trajectory by solving an optimal control problem over a finite future time horizon subject to various physical and specification constraints of the system. The MPC aims for minimizing performance indices of the system motion, such as the error between the reference and the actual motion of the system, the system energy consumption, and the induced system vibration.

Because the MPC is a model-based framework, its performance inevitably depends on the quality of the prediction model used in the optimal control computation. However, in many applications the model of the controlled system is partial unknown or uncertain. In such cases the application of the MPC on the uncertain model can lead to suboptimal performances or even to instability of the controlled system.

Accordingly, there is a need for a method for controlling an operation of a system using the MPC that includes uncertainty.

SUMMARY OF THE INVENTION

Some embodiments of the invention provide a system and a method for controlling an operation of a system according to a trajectory that includes tasks of operation repeated multiple times. The segment of the trajectory representing the task is a reference trajectory of the task. The task usually can be completed over a multiple control steps. An example of such task is a robot arm moving between two points multiple times according to the reference trajectory. Additionally or alternatively, the trajectory can be partitioned into segments representing substantially similar tasks. For example, the trajectory of the movement of a train can be partitioned into an acceleration task, deceleration task and a coasting task.

Some embodiments control the system using an optimization-based receding horizon control. An example of the receding horizon control is a model predictive control (MPC). In various embodiments of the invention, the MPC includes at least one parameter of uncertainty. For example, the MPC of the movement of the arm of the robot can include an uncertainty about a mass of the arm carrying an object. The control of the movement of the train can include an uncertainty about a friction between the wheels and the rails.

Various embodiments of the invention update the parameter of uncertainty of the MPC during the control itself. Specifically, it is recognized that the similarities of the control for performing the task of the operation can be used to update the uncertainty of the MPC for subsequent completions of the tasks. The uncertainty of the MPC can be updated based on the performance of the system for current completion of the task. In some embodiments, the uncertainty of the MPC is updated iteratively over multiple completion of the task to estimate the true value of the parameter of the uncertainty of the MPC.

Some embodiments of the invention are based on another realization that the parameter of the uncertainty of the MPC can be updated using various model free optimizations methods. For example, one embodiment uses an extremum seeking method, e.g., multivariable extremum seeking (MES). Another embodiment uses a reinforcement learning optimization. Those model free optimizations methods are usually used for optimizing the control by analyzing the real-time changes of the output of the system. However, some embodiments of the invention replace the optimized control with the parameter of uncertainty, and, also, replace the analyses of the future reaction of the system with analyses of previous outputs of the system for completion of the task.

Such replacements allow combining the performance of the MPC and a model-free optimization for simultaneous identification and control of linear systems with uncertainties which can be time-varying or constants. While regulation and identification are seemingly conflicting objectives, by identifying or re-identifying the system dynamics online and updating the parameter of uncertainty of the MPC, the performance of the MPC is improved.

In various embodiments of the inventions, the parameters of uncertainty of the MPC can vary. In some embodiments, the parameter of uncertainty includes a structural uncertainty of a model of the system. In alternative embodiments, the parameter of uncertainty includes a feedback gain of the MPC or a cost function of the MPC.

Accordingly, one embodiment discloses a method for controlling an operation of a system according to a reference trajectory of a task of the operation. The method includes controlling the system for a multiple control steps according to the reference trajectory of the task of the operation to produce an actual trajectory of the system completing the task of the operation, wherein, for each control step, a control input to the system is determined using a solution of a model predictive control (MPC) over a receding horizon, wherein the MPC includes at least one parameter of uncertainty; determining a value of a learning cost function of a distance between the reference trajectory and the actual trajectory; determining, using a model free optimization, a value of the parameter of uncertainty reducing the value of the learning cost function to produce an updated parameter of uncertainty; and determining a set of control inputs for completing the task according to the reference trajectory using the MPC with the updated parameter of uncertainty. The steps of the method are performed by at least one processor.

Another embodiment discloses a controller for controlling an operation of a system according to a reference trajectory of a task of the operation. The controller includes at least one processor for controlling the system for a multiple control steps according to the reference trajectory of the task of the operation to produce an actual trajectory of the system completing the task of the operation, wherein, for each control step, a control input to the system is determined using a solution of a model predictive control (MPC) over a receding horizon, wherein the MPC includes at least one parameter of uncertainty; determining a value of a learning cost function of a distance between the reference trajectory and the actual trajectory; determining, using a model free optimization, a value of the parameter of uncertainty reducing the value of the learning cost function to produce an updated parameter of uncertainty; and determining a set of control inputs for completing the task according to the reference trajectory using the MPC with the updated parameter of uncertainty.

BRIEF DESCRIPTION OF THE DRAWINGS

FIG. 6B shows a pseudo code for implementation of the method of FIG. 6A in one embodiment that uses MES as the model-free optimization;

DETAILED DESCRIPTION OF THE PREFERRED EMBODIMENT

Figure 1:
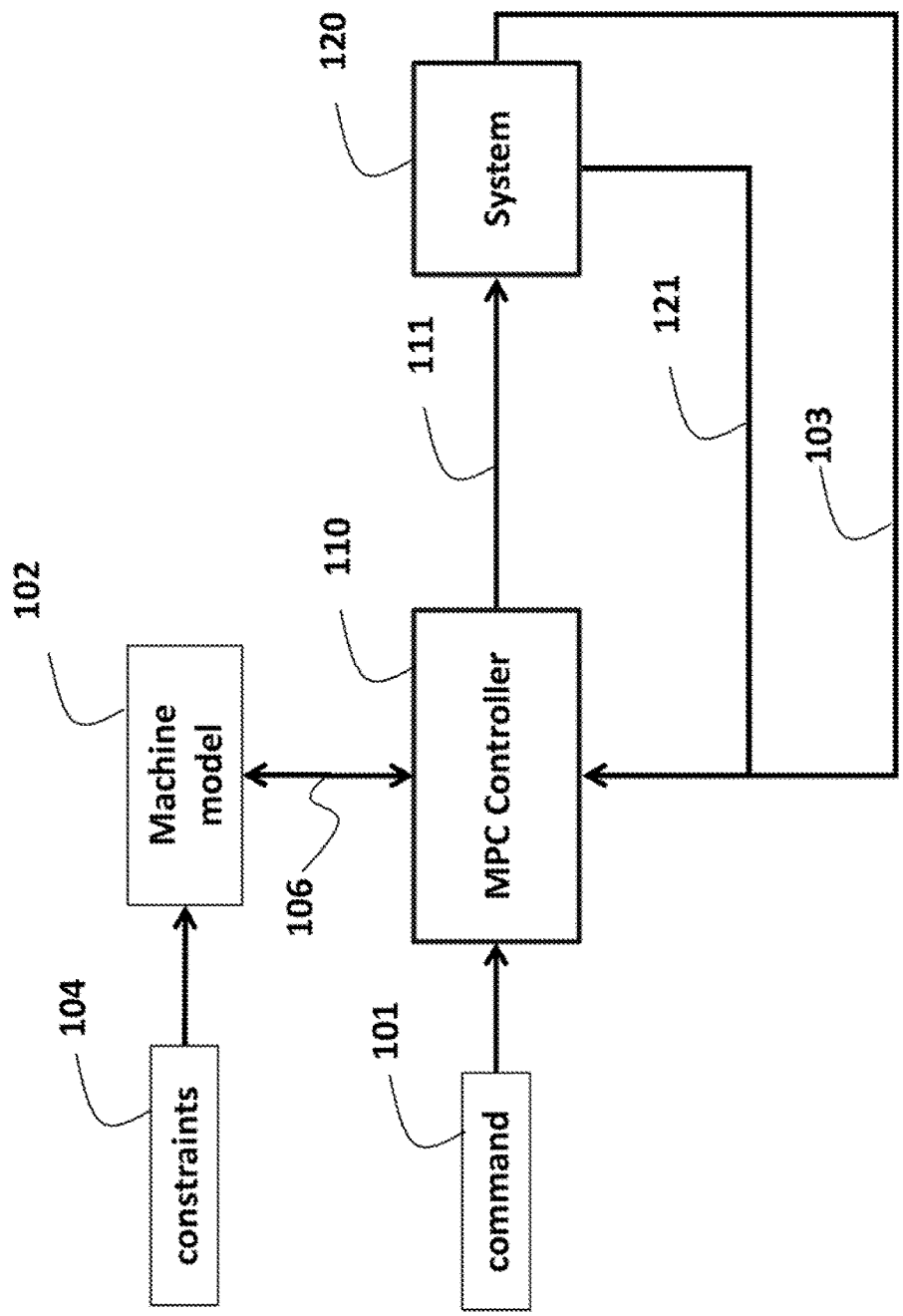
FIG. 1 is a block diagram of an exemplar system controlled according to some embodiments of the invention.

FIG. 1 shows an exemplar system 120 connected to controller 110, e.g., an MPC controller, according to some embodiments of the invention. The controller 110 is programmed according to a model 102 of the system. The model can be a set of equations representing changes of a state 121 and output 103 of the system 120 over time as functions of current and previous inputs 111 and previous outputs 103. The model can include constraints 104 that represent physical and operational limitations of the system.

During the operation, the controller receives a command d 101 indicating, the reference operation of the system. The command can be, for example, a motion command. In response to receiving the command 101, the controller generates input u 111 for the system. In response to the input, the system updates the output y 103 and the state x 121 of the system.

In some embodiments, the command 101 is for controlling the system for a multiple control steps according to a trajectory that includes tasks of operation repeated multiple times. The segment of the trajectory representing the task is referred herein as a reference trajectory of the task. The task is usually can be completed over a multiple control steps. An example of such task is a robot arm moving between two points multiple times according to the reference trajectory. Additionally or alternatively, the trajectory can be partitioned into segments representing substantially similar tasks. For example, the trajectory of the movement of a train can be partitioned into an acceleration task, deceleration task and a coasting task.

In response to the control according to the reference trajectory of the task, the output and/or the state of the system produce an actual trajectory of the system completing the task of the operation. For example, if the reference trajectory represents the desired motion of the arm of the robot, the actual trajectory represents the actual motion of the arm, which can differ from the reference trajectory due to, e.g., uncertainty of a model of the control system. Various embodiments of the invention determines 106 the uncertainty to reduce the difference between the reference and the actual trajectories.

The system, as referred herein, is any device that can be controlled by certain manipulation input signals (inputs), possibly associated with physical quantities such as voltages, pressures, forces, and to return some controlled output signals (outputs), possibly associated with physical quantities such as currents, flows, velocities, positions. The output values are related in part to previous system output values, and in part to previous and current input values. The dependency of previous inputs and previous outputs is encoded in the system state. The operation of the system, e.g., a motion of the system, can include a sequence of output values generated by the system following the application of certain input values.

One embodiment expresses the mode 102 as a linear difference equation $$x(k+1)=Ax(k)+Bu(k),$$

$$y(k)=Cx(k)+Du(k), \quad (1)$$

where k is a time instant when the signals are sampled, u is the system input, y is the system output, x is the state of the system, and A, B, C, are parameters of the model of the system.

The system can be subject to physical and specification constraints limiting the range where the outputs, the inputs, and also possibly the states of the system are allowed to operate.

These constraints can be formulated as $$x_{min} \leq x(k) \leq x_{max},$$

$$u_{min} \leq u(k) \leq u_{max},$$

$$y_{min} \leq y(k) \leq y_{max}, \quad (2)$$

where $x_{min}$, $x_{max}$, $u_{min}$, $u_{max}$, and $y_{min}$, $y_{max}$ are the lower and upper bounds on the state, input, and output, respectively.

Some embodiments control the system using an optimization-based receding horizon control. An example of the receding horizon control is a model predictive control (MPC). At every control step k, the controller of the MPC solves the finite horizon optimal control problem $$\min_{U(k)} \sum_{i=0}^{N-1} \|x(i|k)\|_{Q_M}^2 + \|u(i|k)\|_{R_M}^2 + \|x(N|k)\|_{P_M}^2, \quad (3)$$

s.t.

$x(i+1|k) = Ax(i|k) + Bu(i|k),$ $y(i|k) = Cx(i|k) + Du(i|k),$ $x_{min} \leq x(i|k) \leq x_{max}, i \in \mathbb{Z}_{[1,N_c]},$ $u_{min} \leq u(i|k) \leq u_{max}, i \in \mathbb{Z}_{[0,N_{cu}-1]},$ $y_{min} \leq y(i|k) \leq y_{max}, i \in \mathbb{Z}_{[0,N_c]},$ $u(i|k) = K_f x(i|k), i \in \mathbb{Z}_{[N_u,N-1]},$ $x(0|k) = x(k),$ where $Q_M \succ 0$, $P_M$, $R_M \succ 0$ are symmetric weight matrices of appropriate dimensions, N is the prediction horizon, Nu<N is the control horizon (the number of free control moves), $N_{cu}$<N, $N_c$<N−1 are the input and output constraint horizons along which the constraints are enforced.

The controller is hardware or a software program executed in a processor, e.g., a microprocessor, which at fixed or variable period sampling intervals receives the system outputs and the reference operation of the system motion, and determines, using this information, the inputs for operating the system. The processor is suitably programmed to perform the steps of the methods according to various embodiments.

Figure 2:
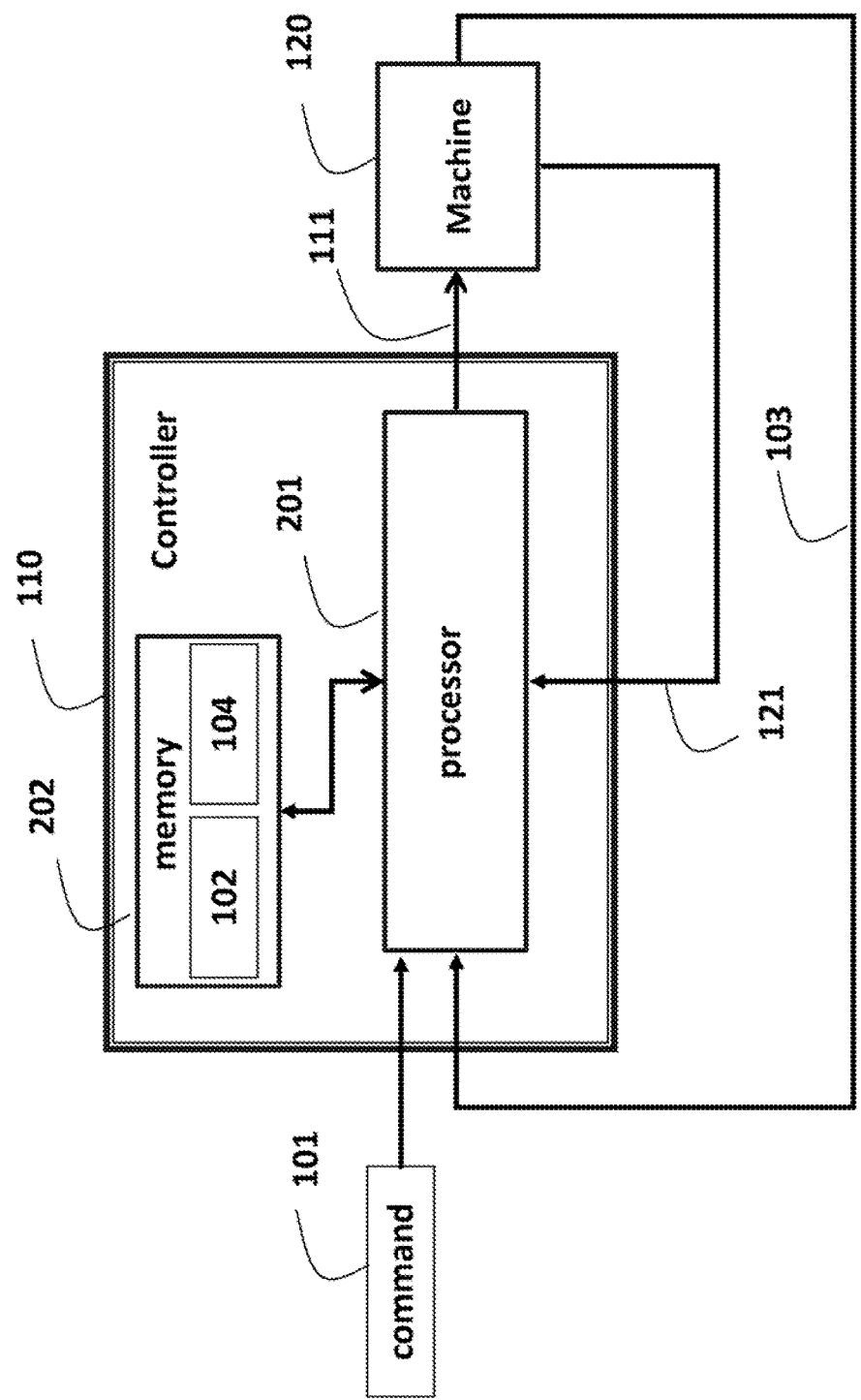
FIG. 2 is a block diagram of a controller according to some embodiments of the invention.

FIG. 2 shows a block diagram of the controller 110 according one embodiment of the invention. The controller 110 includes a processor 201 connected to a memory 202 for storing the model 102 and the constraints 104, such as constraints of the system, e.g., physical and specification constraints, constraints on a transient of the reference trajectory and constraints on the operation of the system.

In various embodiments of the invention, the MPC includes at least one parameter of uncertainty. For example, the MPC of the movement of the arm of the robot can include an uncertainty about a mass of the arm caring an object. The control of the movement of the train can include an uncertainty about a friction of the wheels with the rails in current weather conditions. In some embodiments, the processor 201 is used to determine the uncertainties of the control. Additionally or alternatively, a different processor can be used to determine the uncertainties.

Although the optimal control problem (3) does not explicitly include a reference trajectory, tracking the difference between the actual and the reference trajectories can be achieved by including the reference prediction dynamics $$r_r(k+1) = A_r r_r(k), \quad (4)$$

in the model (1), and an additional output in (1) represents the tracking error $$y_e(k) = Cx(k) - C_r r_r(k), \quad (5)$$

which is accounted for in the cost function in (3). At time step of the control k, the MPC problem (3) is initialized with the current state value x(k) by (3) and solved to obtain the optimal sequence U(k). Then, the control input u(k)= [I 0 . . . 0]U(k) is applied to the system.

Various embodiments of the invention update the parameter of uncertainty of the MPC during the control itself. Specifically it is recognized that the similarities of the control for performing the task of the operation can be used to update the uncertainty of the MPC for subsequent completions of the tasks. The uncertainty of the MPC can be updated based on the performance of the system for current completion of the task. In some embodiments, the uncertainty of the MPC is updated iteratively over multiple completion of the task to estimate the true value of the parameter of the uncertainty of the MPC.

Figure 3:
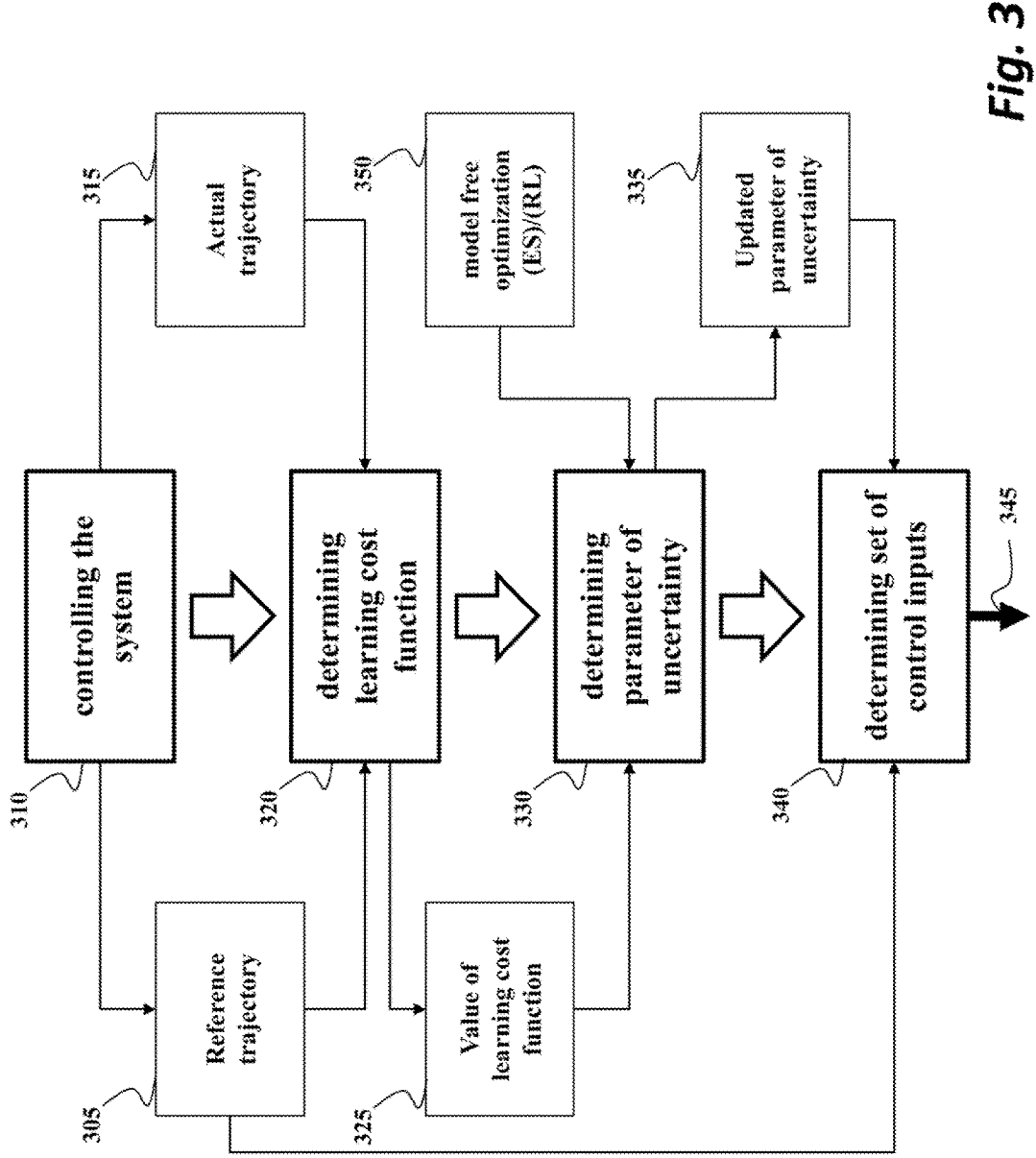
FIG. 3 is a block diagram of a method for controlling an operation of a system according to a reference trajectory of a task of the operation according to some embodiments of the invention.

FIG. 3 shows a block diagram of a method for controlling an operation of a system according to a reference trajectory of a task of the operation according to some embodiments of the invention. The method can be implemented using a suitably programmed processor, such as the processor 201.

The method controls 310 the system for a multiple control steps, e.g., three or more, according to the reference trajectory 305 of the task of the operation to produce an actual trajectory 315 of the system completing the task of the operation. For each control step, a control input to the system is determined using a solution of the MPC over a receding horizon, wherein the MPC includes at least one parameter of uncertainty.

In various embodiments of the inventions, the parameters of uncertainty of the MPC can vary. In some embodiments, the parameter of uncertainty includes a structural uncertainty of a model of the system. In alternative embodiments, the parameter of uncertainty includes a feedback gain of the MPC (for a closed-loop control) or a cost function of the MPC.

Next, the method determines 320 a value 325 of a learning cost function of a distance between the reference trajectory and the actual trajectory. The method for determining the value 325 can vary among embodiments. For example, one embodiment uses Euclidian distances between corresponding samples of the trajectories to determine the value. The sum of the Euclidian distances can be normalized to determine the value 325. Other method for determining a tracking error can also be used.

Knowing the value 325, the method uses a model free optimization 350 to determine 330 a value of the parameter of uncertainty reducing the value of the learning cost function to produce an updated parameter of uncertainty 335. Next, the method determines 340 a set of control inputs 345 for completing the task according to the reference trajectory 305 using the MPC with the updated parameter of uncertainty 335.

For example, in one embodiment of the invention, the parameter of uncertainty includes a structural uncertainty of a model of the system, such that $$x(k+1) = (A+\Delta A)x(k) + (B+\Delta B)u(k)$$

$$y(k) = (C+\Delta C)x(k) + (D+\Delta D)u(k), \quad (6)$$

wherein A, B, C, D are parameters of the model of the system, e.g., weight matrices of the model of the system, and ΔA, ΔB, ΔC, and ΔD represents the uncertainties of the corresponding weight matrices.

The a learning cost function of the distance between the reference trajectory and the actual trajectory can be defined as $$Q(\hat{\Delta}) = F(y_e(\hat{\Delta})), \quad (7)$$

wherein $\hat{\Delta}$ is the parameter of uncertainty, e.g., a vector obtained by concatenating all the elements of the estimated uncertainty matrices $\Delta\hat{A}$, $\Delta\hat{B}$, $\Delta\hat{C}$ and $\Delta\hat{D}$, F: $\mathbb{R}^p \to \mathbb{R}$, $F(0)=0$, $F(y_e)>0$ for $y_e \neq 0$, wherein $y_e$ is a tracking error, i.e., the distance between the reference trajectory and the actual trajectory, and $Q(\hat{\Delta})$ is the value of a learning cost function.

Some embodiments of the invention update the value of the parameter of uncertainty to reduce the value of the learning cost function. Because the parameter of uncertainty implicitly influences the value of the learning cost function, the standard optimization methods are not used by the embodiments. Instead, some embodiments use various model free optimizations methods to update the parameter of uncertainty.

For example, one embodiment uses an extremum seeking method, e.g., a multivariable extremum seeking (MES). Another embodiment uses a reinforcement learning optimization. Those model free optimizations methods are usually used for optimizing the control by analyzing the real-time changes of the output of the system. Some embodiments of the invention, however, replace the optimized control with the parameter of uncertainty, and, also, replace the analyses of the future reaction of the system with analyses of previous outputs of the system for completion of the task.

Figure 4:
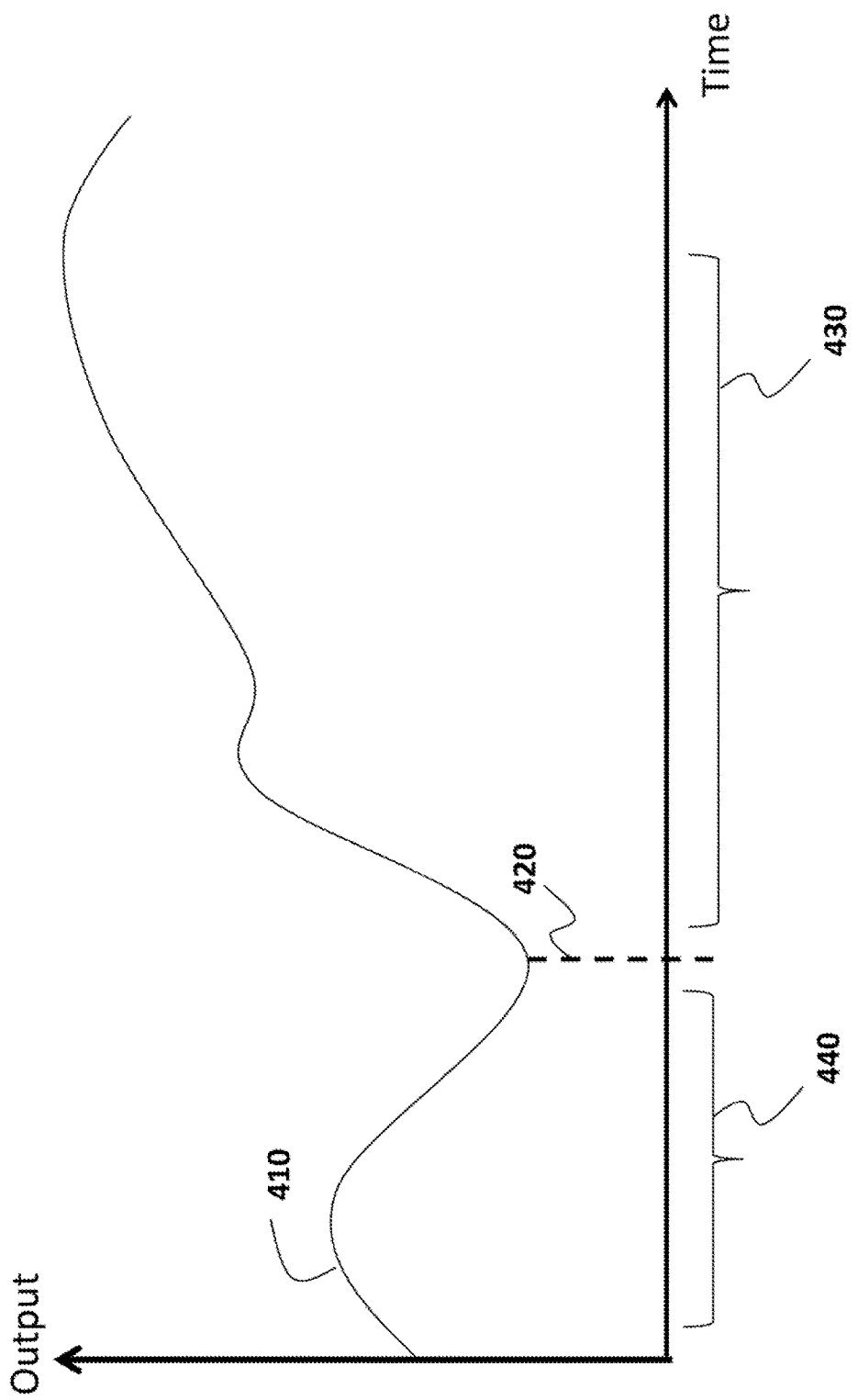
FIG. 4 is a schematic illustrating one of the differences between the learning cost function and a cost function of MPC used to determine a control input.

FIG. 4 shows a schematic illustrating one of the differences between the learning cost function and a cost function of MPC used to determine a control input 111. Both functions are determined based on a performance 410, e.g., output and/or state of the system over time of control. However, the MPC cost function is determined for a control step at time 420 based on the estimation of the future performance 430 of the system. In contrast, the learning cost function is determined for the control step at time 420 based on the past performance 440 of the system.

For example, one embodiment uses the MES according to $$\dot{z}_i = a_i \sin\left(\omega_i t + \frac{\pi}{2}\right) Q(\hat{\Delta}) \quad (3)$$

$$\hat{\Delta}_i = z_i + a_i \sin\left(\omega_i t - \frac{\pi}{2}\right), i \in \{1, \ldots, N_p\}$$

with $N_p \leq nn+nm+pn+pm$ is the number of uncertain elements, $\omega_i \neq \omega_j$, $\omega_i + \omega_j \neq \omega_k$, i, j, k$\in\{1, \ldots, N_p\}$, and $\omega_i > \omega^*$, $\forall i \in \{1, \ldots, N_p\}$, with $\omega^*$ large enough, converges to the local, minima of Q, wherein $z_i$, $i \in \{1, \ldots, N_p\}$ are intermediate learning variables, $\omega_i$, $i \in \{1, \ldots, N_p\}$ are given learning frequencies, $\omega^*$ is a lower limit of the learning frequencies, t is the time variable, and $\alpha_i$, $i \in \{1, \ldots, N_p\}$ are learning amplitudes.

Some embodiments are based on recognition that if the learning cost function is determined for repeated tasks of the MPC, the parameter of uncertainty can be iteratively updated to its true value. Accordingly, some embodiments repeat the steps of the method of FIG. 3 a plurality of times, such that the task of the operation is performed the plurality of times, until the value of the learning cost function is below a threshold.

Figure 5:
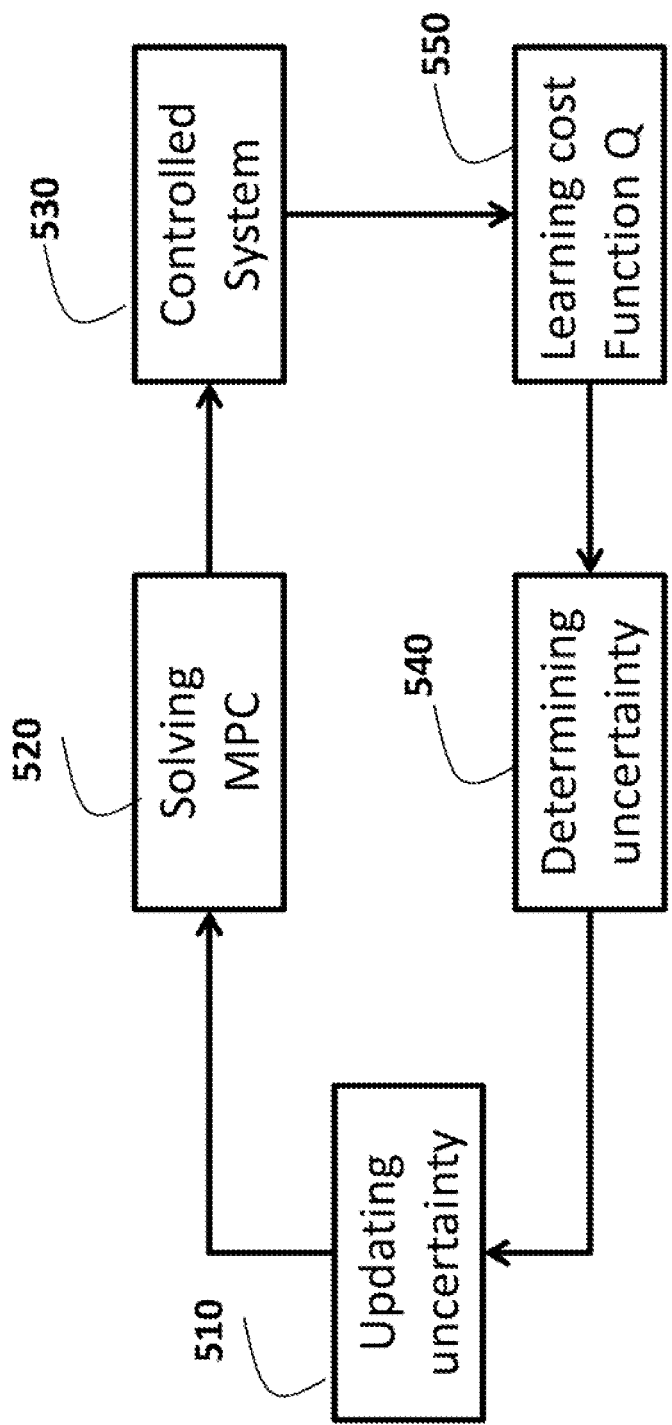
FIG. 5 is a block diagram of a method for iterative update of the parameter of uncertainty of the MPC according to one embodiment of the invention.

FIG. 5 shows a block diagram of a method for iterative update of the parameter of uncertainty of the MPC according to one embodiment of the invention. The embodiment solves 520 the MPC of Equation (3), wherein the MPC includes a parameter of uncertainty according to a model (6). The MPC is solved for multiple steps of control to complete a task of the operation. The control inputs determined by MPC are applied 530 to the controlled system. The output of the controlled system is used to determine 550 the value of the learning cost function, to determine 540 and update 510 the parameter of uncertainty. Next, the MPC with updated parameter of uncertainty is solved 520 again to repeat the task of operation.

Some embodiments of the invention determine various parameters of the MPC and model-free optimization methods to ensure stability of operation and conversion of the parameters of uncertainty to their true value. Such selections ensure merging of the MPC and the model free optimization to result in an adaptive MPC.

Figure 6A:
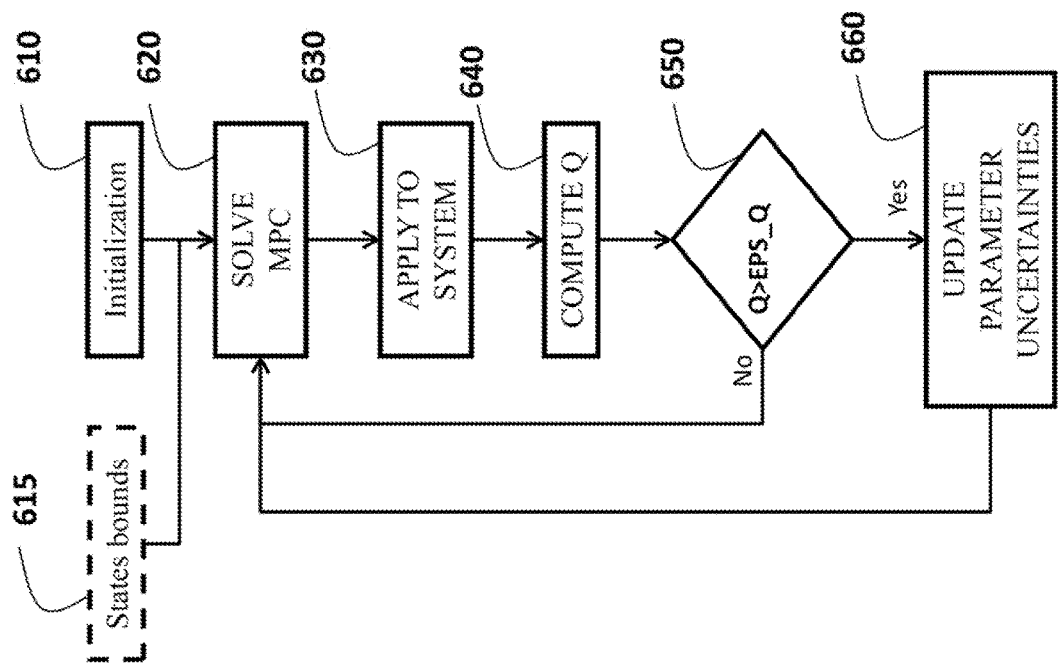
FIG. 6A is a flow chart of a method for an adaptive MPC according to some embodiments of the invention.

FIG. 6A shows a flow chart of a method for an adaptive MPC according to some embodiments of the invention. FIG. 6B shows a pseudo code for implementation of the method of FIG. 6A in one embodiment that uses MES as the model-free optimization.

The method initializes 610 various parameters of the MPC, such as MPC sampling time and/or a length of the horizon. The method also initializes various parameters of MES, such as amplitude and frequency of dither signal. The method also initializes a threshold for the value of the learning cost function. The learning cost function is analytic and admits at least a local minimum in the search domain.

The embodiment can also optionally determine bounds of a safety region 615 for the state of the system. The bounds 615 are used to force the model of the system with updated parameters of uncertainty to remain within the safety region to ensure the safety of operation of the system, since the learning is done online while the system is operating. This safety region is defined in such a way for the MPC problem to be feasible within the constraints of the system. Thus, in this embodiment, the determining of the updated parameter of uncertainty is subject to bounds of a safety region.

For example, one variation of this embodiment updates the parameters of uncertainty in such a way that the search of the updated model is done within the safety region. Alternative variation of the embodiment restricts the updated models to the safety set by projecting the values of the updated parameters of uncertainty into the safety set, using a projection operator. Another variation uses searches for the updated parameters of uncertainty under constraints bounded in the desired safety region.

After the initialization, the method solves 620 the MPC with initialized parameters and applies 630 the control inputs determined by the MPC to the system to complete the task of the operation. After completion of the task the value Q of the learning cost function is determined 640 and compared 650 with the threshold. If the value Q is less than the threshold, the MPC 620 is repeated without the update. Otherwise, the parameter of uncertainty of the MPC is updated 660 using model-free optimization, and the subsequent control 620 is performed using the updated parameter.

In various embodiments of the inventions, the parameters of uncertainty of the MPC can vary. In some embodiments, the parameter of uncertainty includes a structural uncertainty of a model of the system. In alternative embodiments, the parameter of uncertainty includes a feedback gain of the MPC or a cost function of the MPC, such as final cost or coefficients of the MPC cost function.

Some embodiments of the invention provide a system and a method for controlling an operation of a system according to a trajectory that includes tasks of operation repeated multiple times. The segment of the trajectory representing the task is referred herein as a reference trajectory of the task. The task is usually and can be completed over a multiple control steps. Some embodiments of the invention work with real or virtual tasks.

Figure 7:
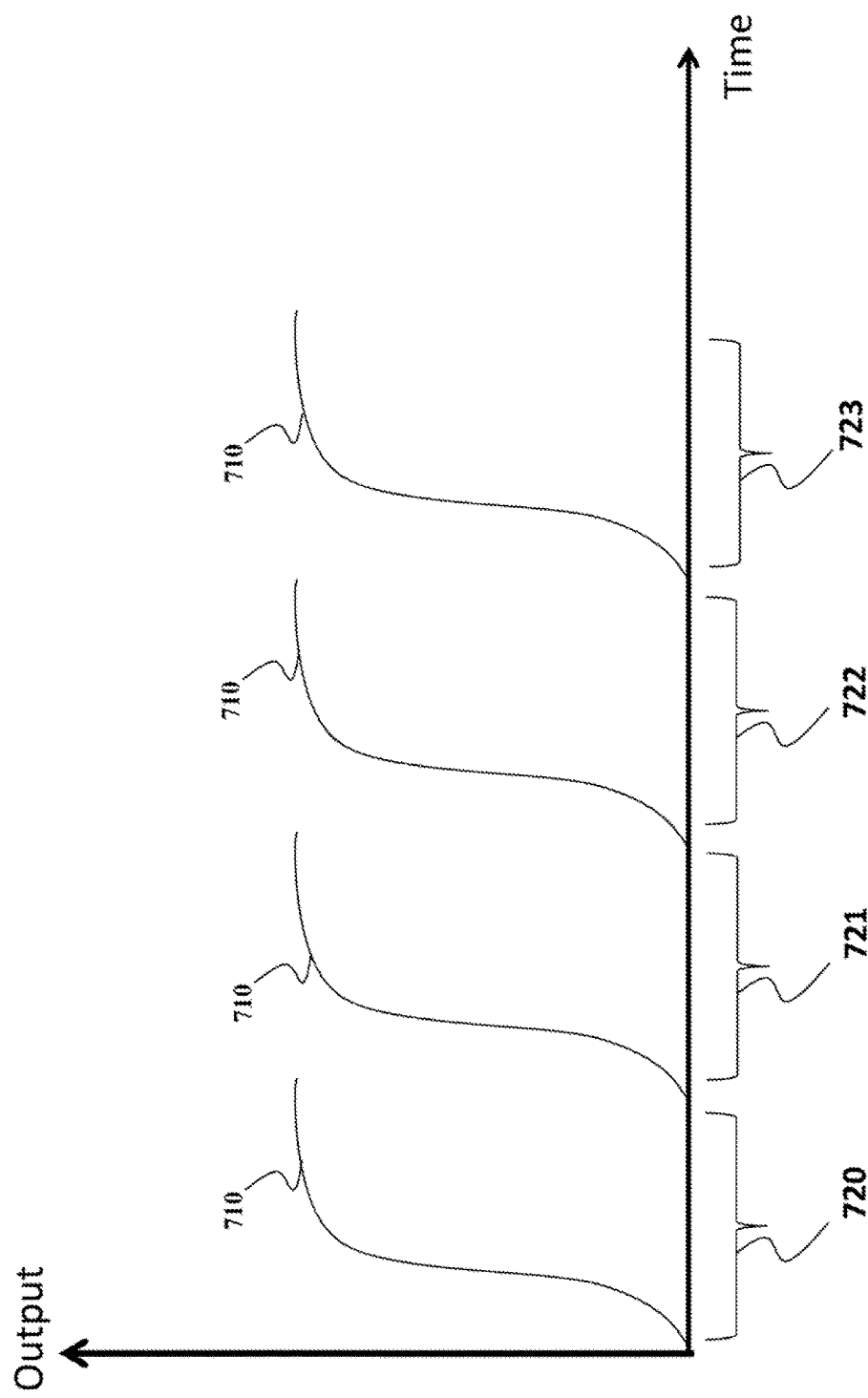
FIG. 7 is a schematic of a real task repeated multiple times according to a reference trajectory.

FIG. 7 shows an example of a real task repeated multiple times 720-723 according to a reference trajectory 710. An example of such task is a robot arm moving a mass between two points multiple times.

Additionally or alternatively, the trajectory can be partitioned into segments representing substantially similar tasks. For example, the trajectory of the movement of a train can be partitioned into an acceleration task, deceleration task and a coasting task. In this case, the acceleration, deceleration and coasting tasks are virtual tasks.

Figure 8:
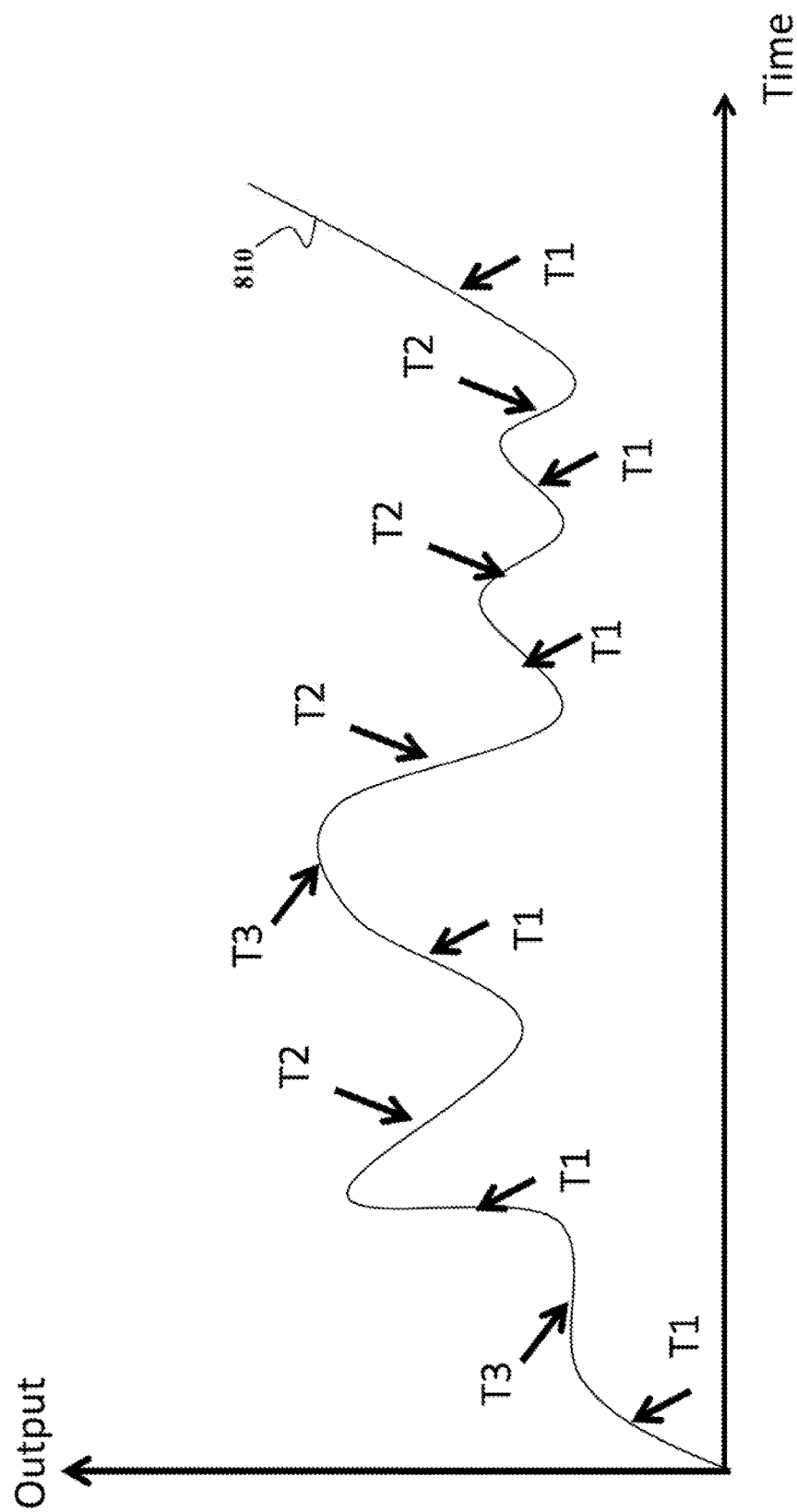
FIG. 8 is a schematic of a method for determining a reference trajectory for a virtual task according to one embodiment of the invention.

FIG. 8 shows an example of determining a reference trajectory according to the virtual tasks. For example, the entire trajectory 810 of the system is partitioned into a set of segments, wherein each segment in the set represents the task of operation. In this example, the trajectory is partitioned into three set of segments, i.e., a set of segment T1 representing, e.g., an acceleration of the system, a set of segment T2 representing, e.g., a deceleration of the system, and a set of segments T3 representing, e.g., a steady state of the system. The reference trajectory is determined separately for each set of segments. For example, the reference trajectory is determined as a trajectory of the segment T1, and the parameter of uncertainty is updated for performance of the task according trajectories of the segments T1.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, a minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools.

Also, the embodiments of the invention may be embodied as a method, of which an example has been provided. The steps performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method of controlling an operation of a system according to a reference trajectory of a task of the operation to produce an actual trajectory using a model predicative control (MPC), comprising:
determining a control input using a solution of the model predictive control (MPC) over a receding horizon, wherein the MPC includes at least one parameter of uncertainty including a parameter of a model of dynamics of the system;
using the control input, determining a value of a learning cost function of a distance between the reference trajectory and the actual trajectory, wherein the learning cost function is
$Q(\Delta)=F(Y_e(\Delta))$, wherein $\Delta$ is the parameter of uncertainty, $y_e$ is the distance between the reference trajectory and the actual trajectory, $F(.)$ is a positive definite function;
determining, using a model free optimization, a value of the parameter of uncertainty reducing the value of the learning cost function to produce an updated parameter of uncertainty, wherein the model free optimization includes a multivariable extremum seeking optimization having an optimized control replaced with a structural uncertainty of the model including a concatenated weight matrices;
determining a set of control inputs, by repeating the determining control input step multiples times, for completing the task according to the reference trajectory using the MPC with the updated parameter of uncertainty, wherein the steps of the method are performed by at least one processor and
using the set of control inputs, completing the task.

2. The method of claim 1, repeating the steps of the method a plurality of times, such that the task of the operation is performed the plurality of times, until the value of the learning cost function is below a threshold.

3. The method of claim 1, wherein a trajectory of the operation of the system includes the reference trajectory repeated multiple times.

4. The method of claim 1, further comprising:
partitioning a trajectory of the operation of the system in a set of segments, wherein each segment in the set represents the task of operation; and
determining the reference trajectory as a trajectory of the segment.

5. The method of claim 1, wherein the learning cost function determines the distance between the entire reference trajectory and the entire actual trajectory.

6. The method of claim 1, wherein the model free optimization includes an extremum seeking optimization having an optimized control replaced with the parameter of uncertainty.

7. The method of claim 1, wherein the model free optimization includes a reinforcement learning optimization.

8. The method of claim 1, wherein the parameter of uncertainty includes a feedback gain of the MPC.

9. The method of claim 1, wherein the parameter of uncertainty includes a parameter of a cost function of the MPC.

10. The method of claim 1, wherein the determining of the updated parameter of uncertainty is subject to bounds of a safety region defining a feasibility of the MPC.

11. A controller to control an operation of a system according to a reference trajectory of a task of the operation to produce an actual trajectory using a model predicative control (MPC), the controller comprising at least one processor for:

determining a control input using a solution of the model predictive control (MPC) over a receding horizon, wherein the MPC includes at least one parameter of uncertainty including a parameter of a model of dynamics of the system;

using the control input, determining a value of a learning cost function of a distance between the reference trajectory and the actual trajectory, wherein the learning cost function is $Q(\Delta)=F(Y_e(\Delta))$, wherein $\Delta$ is the parameter of uncertainty, $y_e$ is the distance between the reference trajectory and the actual trajectory, $F(.)$ is a positive definite function;

determining, using a model free optimization, a value of the parameter of uncertainty reducing the value of the learning cost function to produce an updated parameter of uncertainty, wherein the model free optimization includes a multivariable extremum seeking optimization having an optimized control replaced with a structural uncertainty of the model including a concatenated weight matrices;

determining a set of control inputs, by repeating the determining control input step multiples times, for completing the task according to the reference trajectory using the MPC with the updated parameter of uncertainty and using the set of control inputs, completing the task.

12. The controller of claim 11, wherein a trajectory of the operation of the system includes the reference trajectory repeated multiple times.

13. The controller of claim 11, wherein the model free optimization includes an extremum seeking optimization having an optimized control replaced with the parameter of uncertainty.

14. The controller of claim 11, wherein the model free optimization includes a reinforcement learning optimization.

15. The controller of claim 11, wherein the parameter of uncertainty includes a structural uncertainty of a model of the system.

16. The controller of claim 15, wherein the structural uncertainty includes concatenated weight matrices of a model of the system.

* * * * *